Dec. 30, 1941. V. L. GREEN Re. 21,987

TRUCK BOLSTER STABILIZING MEANS

Original Filed Nov. 3, 1938 2 Sheets-Sheet 1

Dec. 30, 1941. V. L. GREEN Re. 21,987
TRUCK BOLSTER STABILIZING MEANS
Original Filed Nov. 3, 1938 2 Sheets-Sheet 2
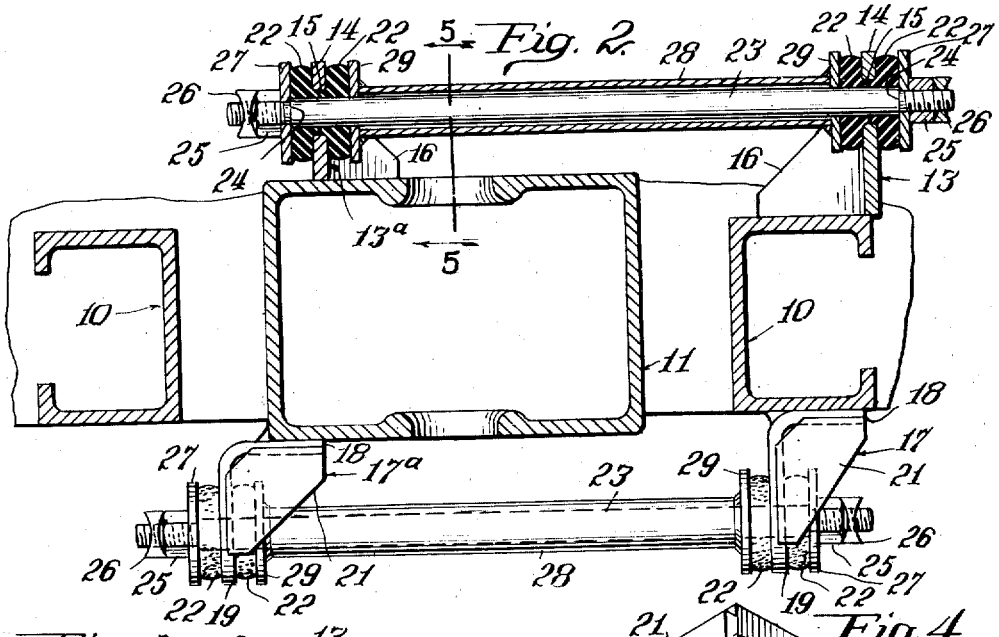
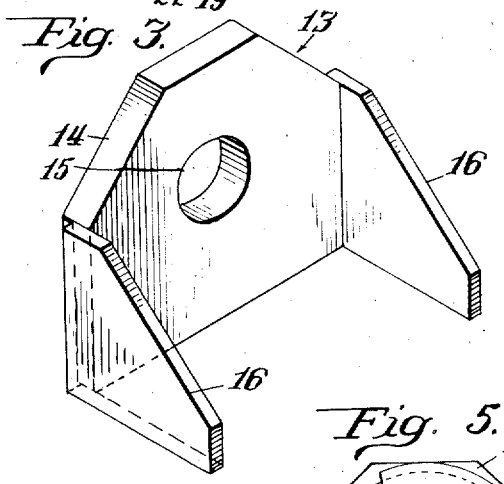
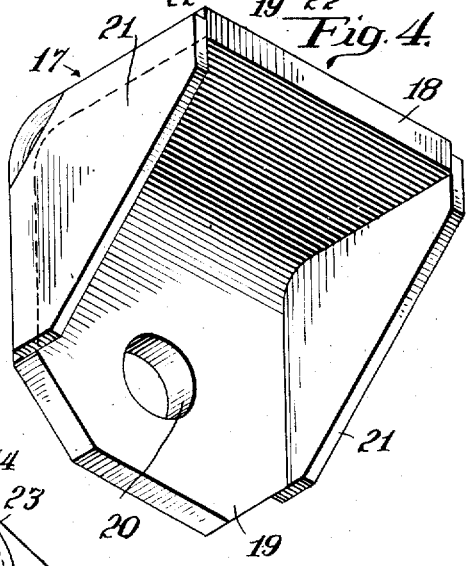
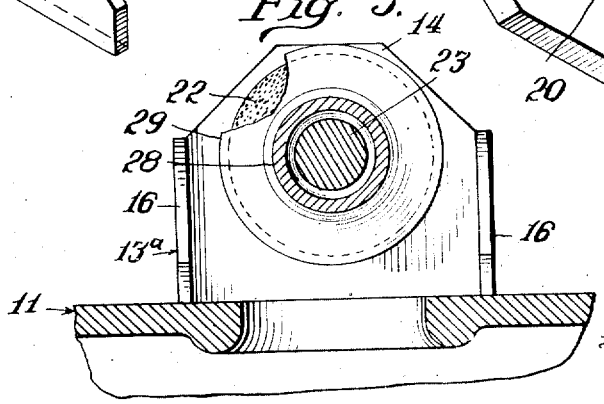
Inventor
Vernon L. Green,
By George Heidman
Attorney Reissued Dec. 30, 1941

Re. 21,987

UNITED STATES PATENT OFFICE 21,987

TRUCK BOLSTER STABILIZING MEANS

Vernon L. Green, Milwaukee, Wis., assignor to General Steel Castings Corporation, Eddystone, Pa., a corporation of Delaware Original No. 2,219,360, dated October 29, 1940, Serial No. 238,591, November 3, 1938. Application for reissue July 12, 1941, Serial No. 402,151

7 Claims. (Cl. 105—200)

My invention relates to means whereby the bolster of a railroad car truck is yieldingly connected to one of the transom members of the truck; the use of the usual chafing or wear plates on the opposing sides of the transom members obviated and the metal to metal contact between bolster and truck frame eliminated, with the result that the wear and noise, due to the slapping contact between the bolster and wear plates, will be overcome.

The invention also has for its object the provision of stabilizing means whereby the pulling force exerted on the car body is transmitted through the bolster and thence yieldingly through my improved means to the transom of the truck, or from the truck, through my improved means to the bolster during brake application; while at the same time permitting the requisite relative lateral and vertical movements between bolster and truck.

The above enumerated objects, as well as others, and the advantages of my improved stabilizer will all be readily comprehended from the detailed description of the accompanying drawings wherein:

Figure 2 is a transverse sectional view taken on the line 2—2 of Figure 1, looking in the direction of the arrows.

Figure 3 is a perspective view of one of the bracket members secured to the top of a transom member.

Figure 4 is a similar view of one of the bracket members secured to the bottom of the transom member.

Figure 5 is a detail sectional view, taken substantially on the line 5—5 of Figure 2, looking in the direction of the arrows.

Figure 1:
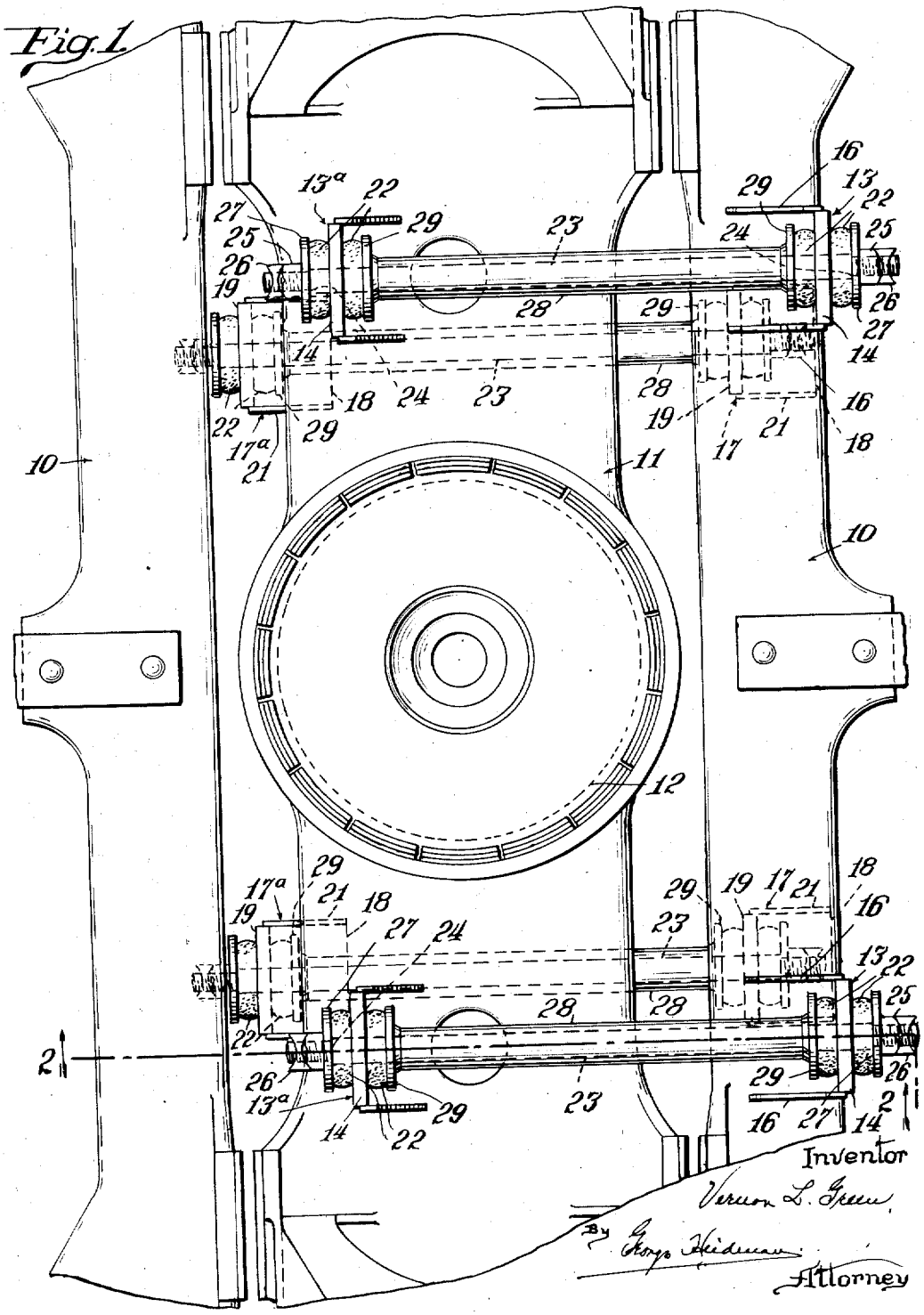
Figure 1 is a top plan view of a portion of a truck frame with my invention applied thereto.

As my invention is applicable to any conventional type of railroad car truck provided with a truck bolster, specific description of the truck frame, beyond the usual transom members and the bolster, need not be entered into for an understanding of my invention and its functions and therefore merely the intermediate portions of the transom members are shown in plan in Figure 1 and in cross section in Figure 2 at 10, 10, with the truck bolster mounted between the transom members being shown at 11. The truck bolster 11 is provided with the usual center plate at 12; the bolster being arranged in spaced relation with the transom members.

My improved stabilizer, in the specific exemplification shown in the drawings, comprises brackets 13, 13 shown in detail in Figure 3, and consisting of the vertically disposed main wall 14, provided with a hole 15, and two side wing portions 16, 16 whose lower edges are disposed in the same horizontal plane as the bottom edge of the main wall 14. A pair of the brackets 13 are rigidly secured, either formed integral with or welded to the top of one of the transom members 10 adjacent opposite ends as shown in Figure 1, with the main wall 14 arranged at the outer longitudinal edge of the transom member and the reenforcing wing portions 16, 16 disposed inwardly toward the bolster.

A pair of brackets 17, 17, shown in detail in Figure 4, are likewise secured to the bottom of the same transom member 10; these brackets, for sake of certain clearances, being shown arranged slightly to one side of the vertical plane of brackets 13, 13, see Figure 1. The brackets 17 each preferably consist of a single angular piece of metal formed to constitute a top wall 18, adapted to be rigidly secured to the lower side of the transom member, and a depending or vertically disposed wall 19 which is provided with a hole 20; reenforcing side plates or wings 21, 21 being preferably provided. The brackets 17, 17 are preferably arranged with the depending wall 19 disposed inwardly toward the plane of the bolster while the reenforcing plates or wings 21, 21 are disposed toward the outer longitudinal side of the transom member, see Figure 2.

The top of the bolster 11, and substantially in horizontal alignment with brackets 13, 13, is provided with a pair of brackets 13a, which are shown substantially similar to brackets 13 except of somewhat less vertical dimensions in order that the openings 15 in the brackets 13a preferably may approximate the horizontal planes of the holes 15 in brackets 13, 13. The brackets 13a, 13a are preferably intimately secured adjacent the longitudinal side of the bolster farthest removed from the transom member provided with brackets 13, 13; the brackets 13a being arranged adjacent opposite ends of the bolster as shown in Figure 1, with their wing portions preferably disposed toward the transom member on which brackets 13 are secured.

The bottom of the bolster 11, substantially in horizontal alignment with brackets 17, 17 is provided with similar brackets 17a, 17a, of somewhat less vertical dimensions than brackets 17. The brackets 17a are shown intimately secured at the longitudinal side of the bolster farthest from the transom member with the brackets 17; the brackets 17a being secured with the reenforcing side plates or wings 21 disposed toward said transom; brackets 17a being arranged in substantial horizontal alignment with brackets 17.

The device contemplates a flexible connection between the bolster and truck which is provided by means of rubber cushions or comparatively thick rubber discs 22, arranged on opposite sides of the vertically disposed walls 14 of brackets 13, 13a and walls 19 of brackets 17, 17a. The cushion elements or rubber discs 22 are each centrally apertured for passage of a long bolt 23, which also passes through the openings 15 of brackets 13 and 13a on top of the transom member and the bolster and through the openings 20 of brackets 17, 17a on the bottom of the transom member and the bolster, see Figure 2. These bolts 23 (of which there are four in number, see Figure 1) are each shouldered adjacent their ends as shown at 24 and the reduced ends threaded to receive nuts and lock-washers as at 25, 26, after washers 27 have been applied; the openings in washers 27 being just sufficient to receive the reduced threaded ends of the bolts in order that movement of the washers lengthwise of the bolts will be prevented by the shoulders 24 of the bolts.

Prior to the passage of the bolts 23 through the rubber discs and the brackets, I provide the bolts with a spacer or separating spool 28 consisting of a suitable length tube whose ends are provided with apertured end plates 29 which are preferably welded to the tube; the tube and end plates permitting free passage of the bolt therethrough.

The length of the bolts and their shoulders have definite relation to the proper positioning of the bolster relative to the transoms of the truck; while the length of the separating or spacer spool 28 and the washer holding shoulders provide a definite limit to the compression of the rubber cushions or discs.

As is apparent from the construction described, the bolster 11 is yieldingly maintained in spaced relation with the transom members and the truck is put in motion by the pulling or pushing forces exerted on the car body operatively connected with the bolster by the center plate, and in turn pass from the bolster to the transom of the truck through my improved stabilizing means, without permitting metal to metal contact between bolster and transom by means of wear plates in structures as at present in use. With my improved stabilizer the frequent slapping of the plates, which increased as the wear plates became worn and more clearance between them resulted, is entirely eliminated and as a result a quieter and smoother running truck is provided, while at the same time obviating the necessity for frequent repair and replacement of wear plates; and although the fore and aft movement of the bolster is yieldingly restrained to an extent equal to the deflection or compression of the rubber cushions or discs, the requisite lateral and vertical movements are not undesirably restrained by the relatively long connecting elements between the bolster and the transom.

Although the specific construction illustrated, from actual use, is believed to be the best embodiment of the invention, modification may be possible without, however, departing from the spirit of my invention as expressed in the appended claims.

What is claimed is:

1. In a railway car truck provided with spaced transoms and a truck bolster arranged in spaced relation therebetween, a plurality of apertured brackets arranged in cooperative pairs on the upper and lower surfaces of the bolster and one of the transoms, elongated bolt-like members arranged transversely of the bolster and said transom with their ends disposed through the apertures of the correlated brackets and the ends of the members provided with shoulders, rubber discs arranged on the ends of the bolt-like members on opposite sides of the apertured walls of the brackets, spacer means slidable on the bolt-like members intermediate of the rubber discs arranged on the inner sides of said brackets, annular members arranged on the ends of the bolt-like members against the shoulders thereof, and means threaded on the ends of the bolt-like members for holding the annular members in compression relation with the rubber discs on the outer sides of said brackets.

2. In a railway car truck provided with spaced transoms and a bolster arranged in spaced relation therebetween, a plurality of tie rods arranged transversely above and beneath the bolster and one of said transom members, bracket members secured to the bolster and to said transom member for slidingly receiving the ends of said tie rods, cushioning elements operatively intermediate of said tie rods and the bracket members, and means associated with the tie rods whereby the cushioning elements are placed under compression during relative movement between the bolster and the transom member and the fore and aft movements of the bolster or the truck yieldingly transmitted from one to the other while free lateral and vertical movements between bolster and truck are permitted.

3. In a railway car truck provided with spaced transoms and a truck bolster arranged in spaced relation therebetween, a plurality of apertured brackets arranged in cooperative pairs on the upper and lower surfaces of the bolster and one of the transom members, tie rods arranged transversely of the bolster and said transom member with their ends disposed through the apertures of the correlated brackets, rubber discs arranged in pairs on the tie rods on opposite sides of the apertured walls of the brackets, and means associated with said tie rods whereby the discs are maintained in place and a disc at each end of the tie rods placed under compression during the relative fore and aft movements of the bolster and the truck.

4. In a railway car truck, a truck frame, a truck bolster, an apertured element on said frame, an apertured element on said bolster, an elongated bolt-like member having its ends disposed through the apertures of said elements, cushions arranged on the end portions of the bolt-like member on opposite sides of each of the apertured elements, one cushion associated with each element facing a cushion associated with the other element, a spacer extending from one of said latter mentioned cushions to the other and being slidably mounted on said member, followers arranged on the ends of the bolt-like member, and means on the ends of the bolt-like member for holding said followers in compression relation with the cushions on said bolt-like member.

5. In a railway car truck, spaced truck parts, a spacer insertible between said parts with its ends spaced therefrom, cushioning members of rubber-like material between the ends of said spacer and the corresponding parts opposing the same, a tie rod receivable lengthwise through said parts, cushioning members on said tie rod at the sides of said parts facing away from said spacer, and means on the ends of said tie rod for engaging the adjacent faces of the latter-mentioned cushioning members, whereby some of the cushioning members are placed under compression during relative movements of said parts longitudinally of the tie rod in one direction and the other cushioning members are placed under compression during relative movements of the parts in the opposite direction, and such movements are yieldingly transmitted from one part to the other part, while relative movements between said parts transversely of said tie rod are permitted.

6. In a railway car truck, spaced truck parts movable in relation to each other, each having surfaces facing in opposite directions, one surface on each part facing towards the other part, a connecting device with its end portions received in said parts, said device including cushions applied respectively to said part surfaces facing each other, a spacer extending from one of said cushions to the other and opposing the same, cushions applied to the other faces of said parts, followers at the outer sides of said latter mentioned cushions, and a rod extending through said parts, cushions, followers and spacer and movable relative to said spacer and securing said followers, cushions and spacer in operating relation to each other and said parts to cushion and resist forces applied between said parts longitudinally of said device.

7. In a railway car truck, spaced truck parts movable in relation to each other and each having a surface facing towards the other part and a surface facing in the opposite direction, cushions applied to said surfaces, a rigid member extending between and spacing the cushions applied to the opposing surfaces of said parts, followers at the outer sides of the other cushions, a rod extending through both of said parts and the cushions and followers thereon, and means limiting movement of the followers towards the ends of the rod, at least one of said means being detachable from said rod to provide for insertion of said rod endwise in one direction through said parts, cushions and followers when said parts are in assembled relation, said rod, cushions, followers and means cushioning and resisting forces applied between said parts longitudinally of said rod and member.

VERNON L. GREEN.